Patented Dec. 15, 1936

2,064,114

UNITED STATES PATENT OFFICE

2,064,114

CONCENTRATED SOLUTIONS OF THE FOLLICLE HORMONE AND ITS ESTERS AND METHODS OF MAKING THE SAME

Friedrich Hildebrandt, Hohen Neuendorf, near Berlin, Germany, assignor to Shering-Kahlbaum A. G., Berlin, Germany No Drawing. Application January 26, 1934, Serial No. 708,427. In Germany January 31, 1933

15 Claims. (Cl. 167—74)

This invention relates to follicle hormones and their esters and more particularly to concentrated solutions of the same and methods of making them.

Hitherto follicle hormones and preparations containing the same or substances of like physiological and therapeutical effect have been applied mostly by injecting their solutions in water or oils. But the solubility of the follicle hormone and its esters in said solvents is only a limited one; thus, its aqueous solutions contain not more than 100 mouse units per cc. and its solutions in oil at most 1000 mouse units per cc.

These low concentrations of at most 1000 mouse units per cc., however, are of great disadvantage; for, the very important therapy by means of the follicle hormone, as described recently by Kaufmann (Centralblatt fuer Gynaekologie 1933, No. 1), which requires comparatively high doses of the hormone, can not be carried out with solutions of low concentrations, since, for instance, for the application of 300,000 mouse units at least 300 cc. of oil have to be injected in the course of two to three weeks; but this is practically impossible.

Now, the main object of this invention is to increase considerably the solubility of the follicle hormones especially of their esters, such as the follicle hormone benzoate, by adding esters of phenols, such as for instance cresol acetate or benzoate, to the former. The amounts necessary to produce noticeable effects vary according to the amounts of the follicle hormone product to be brought in solution. In this manner solutions containing for instance 10,000 and more mouse units per cc. of follicle hormone benzoate are readily obtained.

This and further objects of the present invention will become evident from the explanations set forth in the following description of the invention.

The term "follicle hormone" as used hereinafter in the specification and the claims annexed hereto includes not only the follicle hormone of the formula $C_{18}H_{22}O_2$ but also its more unsaturated derivatives, the equilin of the formula $C_{18}H_{20}O_2$ and the hippolin $C_{18}H_{18}O_2$, and their esters, and other derivatives and substitution products, its hydrogenation products and their derivatives and all other compounds, having the properties and physiological effects of the follicle hormone. They may be obtained from natural sources, such as organs and excretions of animals, urine, especially of pregnant individuals, and the like, as well as synthetically.

The term "phenol ester" as used hereinafter in the specification and in the claims annexed hereto includes all esters of aliphatic as well as aromatic and the like acids, such as the acetates, benzoates, and others, with phenols, especially the cresols.

The following examples serve to illustrate the invention without, however, limiting the same to them.

Example 1

5 grams of crystallized follicle hormone of the melting point 250–253° C. and 5 grams of m-cresol acetate are brought in solution in 1 liter of purest olive oil by first dissolving both substances in a small amount of a readily volatile solvent, such as ether, mixing the ether solution with the olive oil and evaporating the ether. The obtained solution is sterilized and filled into ampoules. Each ampoule contains about 12,000 mouse units per cc.

Example 2

10 grams of β-follicle hormone benzoate of the melting point 217–220° C. and 10 grams of p-cresol benzoate are dissolved in 1.5 liter of sesame oil in the same manner as described in Example 1. 1 cc. of the solution contains, on assaying by the customary methods, 10,000 mouse units per cc.

Various changes may be made in the details disclosed in the foregoing specification without departing from the invention and from the principles set forth herein and in the claims annexed hereto.

What I claim is:—

1. In a method of preparing highly concentrated solutions of a follicle hormone and its esters the step of dissolving said follicle hormone and a phenol ester in an oil, whereby increased solubility of said hormone is obtained.

2. In a method of preparing highly concentrated solutions of a follicle hormone and its esters the step of dissolving said follicle hormone and a phenol ester in a vegetable oil, whereby increased solubility of said hormone is obtained.

3. A method of preparing highly concentrated solutions of a follicle hormone and its esters which comprises dissolving said follicle hormone and a phenol ester in a readily volatile organic solvent, mixing said solution with a sufficient amount of a vegetable oil, and expelling the volatile solvent by evaporation.

4. A method of preparing highly concentrated solutions of a follicle hormone and its esters which comprises dissolving said follicle hormone and a phenol ester in ether, mixing said solution with a sufficient amount of a vegetable oil, and expelling the ether by evaporation.

5. A method of preparing highly concentrated solutions of a follicle hormone and its esters which comprises dissolving said follicle hormone and a phenol ester in ether, mixing said solution with a sufficient amount of olive oil and expelling the ether by evaporation.

6. A method of preparing highly concentrated solutions of a follicle hormone and its esters which comprises dissolving said follicle hormone and a phenol ester in ether, mixing said solution with a sufficient amount of sesame oil and expelling the ether by evaporating.

7. A method of preparing highly concentrated solutions of a follicle hormone and its esters which comprises dissolving said follicle hormone and an ester of an aliphatic carboxylic acid with a phenol in a readily volatile organic solvent, mixing said solution with a sufficient amount of a vegetable oil, and expelling the volatile solvent by evaporation.

8. A method of preparing highly concentrated solutions of a follicle hormone and its esters which comprises dissolving said follicle hormone and an ester of an aromatic carboxylic acid with a phenol in a readily volatile organic solvent, mixing said solution with a sufficient amount of a vegetable oil, and expelling the volatile solvent by evaporation.

9. A method of preparing highly concentrated solutions of a follicle hormone and its esters which comprises dissolving said follicle hormone and a phenol acetate in a readily volatile organic solvent, mixing said solution with a sufficient amount of a vegetable oil, and expelling the volatile solvent by evaporation.

10. A method of preparing highly concentrated solutions of a follicle hormone and its esters which comprises dissolving said follicle hormone and a phenol benzoate in a readily volatile organic solvent, mixing said solution with a sufficient amount of a vegetable oil, and expelling the volatile solvent by evaporation.

11. A solution of a follicle hormone in a vegetable oil, said solution containing a phenol ester, the amount of said dissolved hormone being substantially greater than that capable of being dissolved in the absence of said phenol ester.

12. A solution of a follicle hormone ester in a vegetable oil, said solution containing a phenol ester, the amount of said dissolved hormone being substantially greater than that capable of being dissolved in the absence of said phenol ester.

13. A solution of a follicle hormone benzoate in a vegetable oil, said solution containing a phenol ester, the amount of said dissolved hormone being substantially greater than that capable of being dissolved in the absence of said phenol ester.

14. A sterilized solution of a follicle hormone in a vegetable oil, said solution containing a phenol ester, the amount of said dissolved hormone being substantially greater than that capable of being dissolved in the absence of said phenol ester.

15. A sterilized solution of a follicle hormone ester in a vegetable oil, said solution containing a phenol ester, the amount of said dissolved hormone being substantially greater than that capable of being dissolved in the absence of said phenol ester.

FRIEDRICH HILDEBRANDT.